Aug. 25, 1931.  S. L. WALKER  1,820,547
MEASURING AND WEIGHING DEVICE FOR CONCRETE MIXERS
Filed April 5, 1928  3 Sheets-Sheet 1
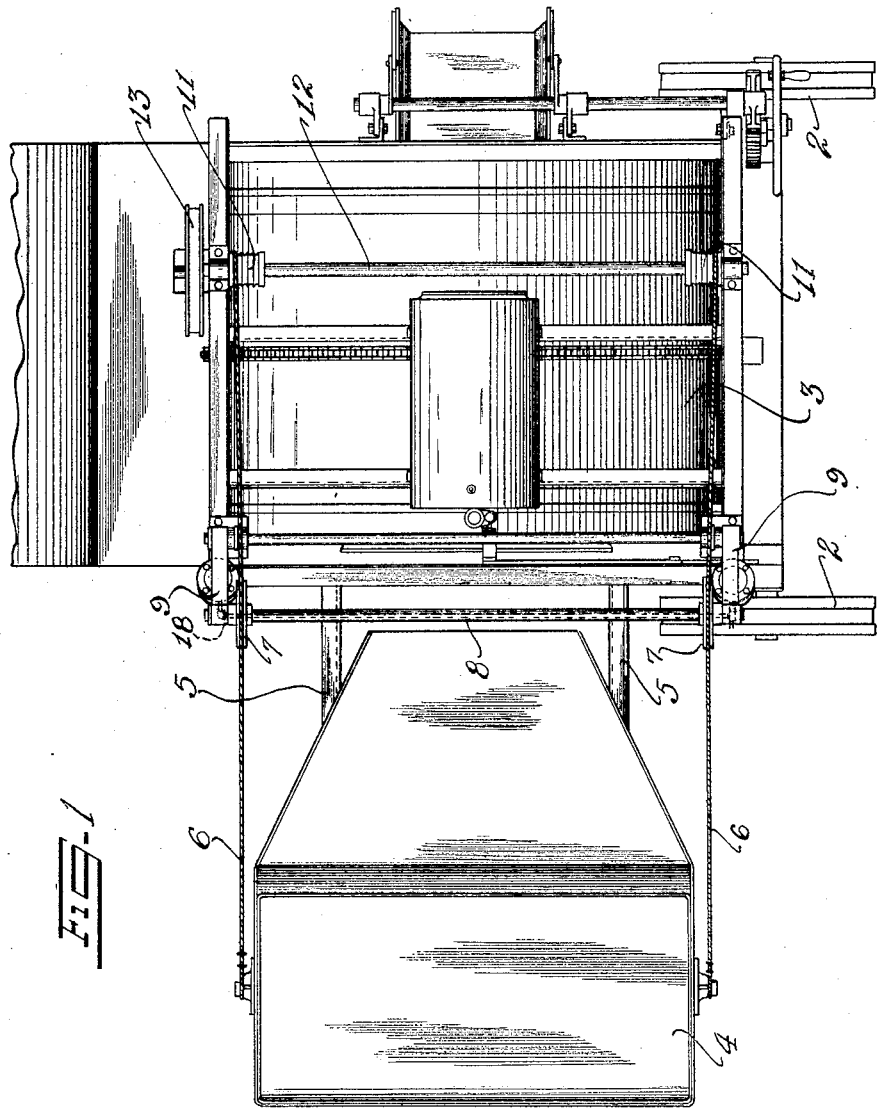
Inventor
Sidney L. Walker Aug. 25, 1931.   S. L. WALKER   1,820,547
MEASURING AND WEIGHING DEVICE FOR CONCRETE MIXERS
Filed April 5, 1928   3 Sheets-Sheet 2
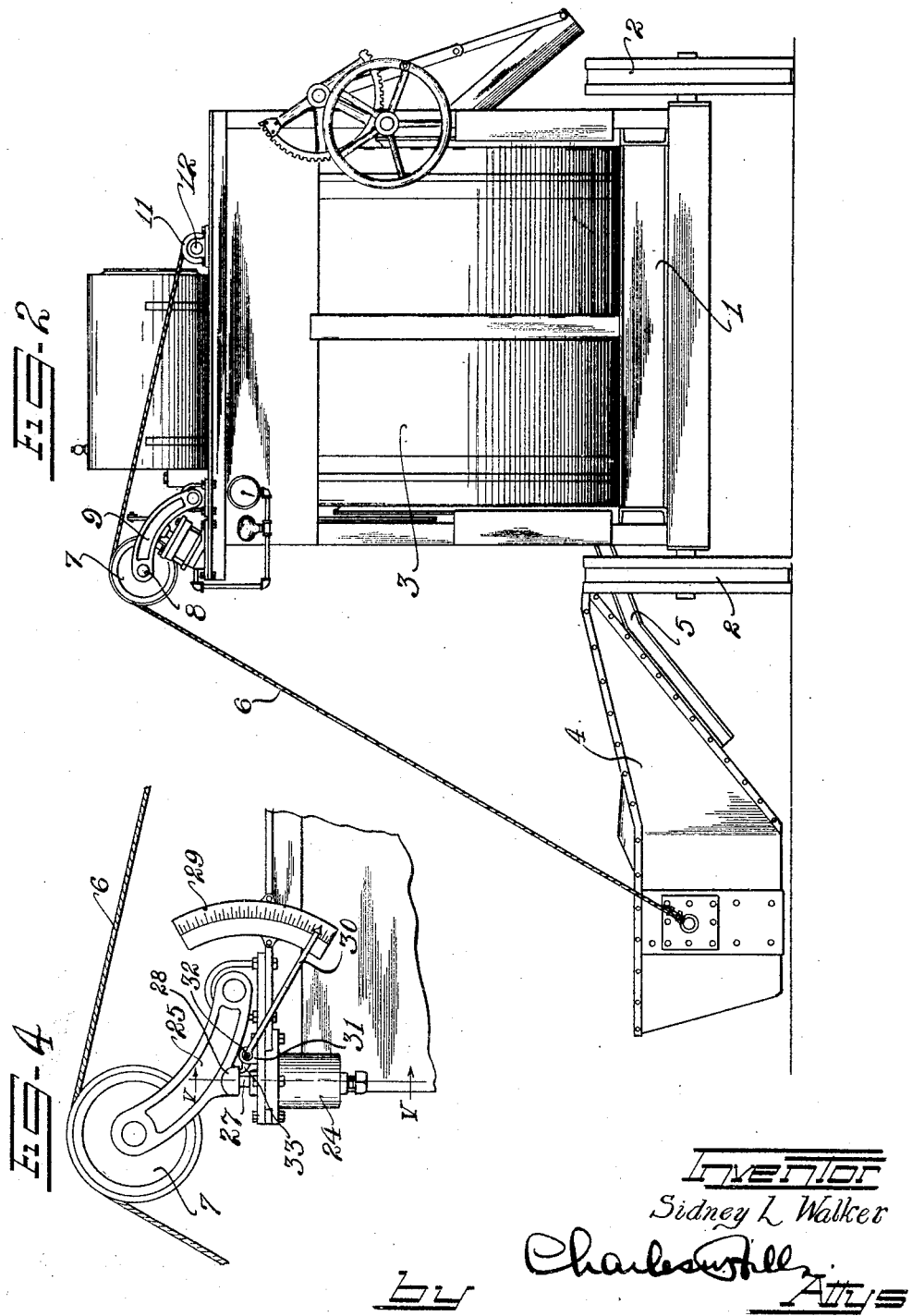
Inventor
Sidney L. Walker
by Charles Hill
Attys

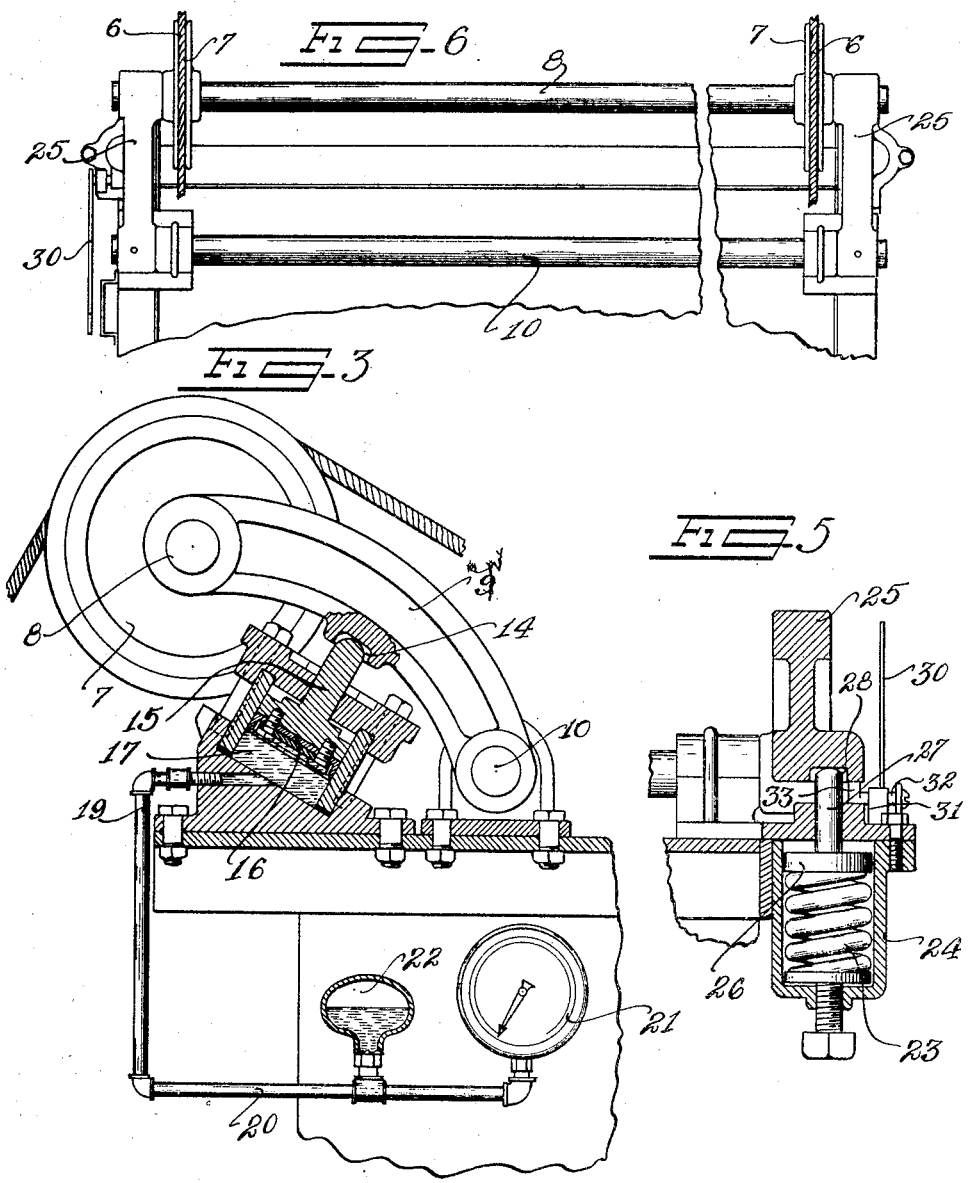

Patented Aug. 25, 1931

1,820,547

UNITED STATES PATENT OFFICE

SIDNEY L. WALKER, OF JACKSON, MICHIGAN, ASSIGNOR TO THE KNICKERBOCKER COMPANY, A CORPORATION OF MICHIGAN

MEASURING AND WEIGHING DEVICE FOR CONCRETE MIXERS

Application filed April 5, 1928. Serial No. 267,599.

This invention relates to a weighing attachment for mixing machines of that type involving a swinging skip, and broadly comprises weighing means responsive to the supporting means for the skip for indicating the weight of the ingredients dumped into the skip.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a top plan view of a mixing machine to which this invention has been applied.

Figure 2 is a side elevation of such machines.

Figure 3 is an enlarged part sectional and part elevational view of the weighing attachment.

Figure 4 is a fragmentary elevational view of a modified form of weighing attachment.

Figure 5 is a sectional view taken upon the line V—V of Figure 4.

Figure 6 is a fragmentary enlarged elevational view of certain parts of the machine involving the modified form of weighing attachment.

The mixing machine in connection with which the weighing attachment involving this invention is used consists of the usual truck 1 mounted upon wheels 2 and carrying the rotary mixing drum 3. The rotary drum is supplied with material by means of a swingable skip 4 which is pivoted to the side of the machine by means of suitable brackets 5.

A pair of cables 6 is attached to the skip 4 and these cables are trained over pulleys 7 mounted upon a shaft 8 which is supported by the arcuate brackets 9. The lower ends of the brackets are pivoted to a shaft 10 journaled in suitable castings upon the top of the machine. The cables extend rearwardly and are wound upon suitable drums 11 fixed upon a shaft 12 which is journaled in suitable bearings upon the top of the machine. A driving pulley 13 is shown upon one end of the shaft 12 for rotating the same.

Each of the arms 9 is provided with a bearing 14 (Figure 3) that engages the end of a piston stem 15, the piston 16 of which operates in a fluid chamber 17 which may be constructed in any well-known manner and positioned upon the top of the machine.

In the present instance it will be noted that the piston and its chamber are obliquely located, in order that the thrust upon the piston shall always be substantially normal. The fluid chambers upon the opposite sides of the machine are preferably connected by an equalizing pipe 18, shown in dotted lines in Figure 1.

Beneath the piston 16 there extends a pressure pipe 19 which has a horizontal branch 20 at a convenient point below the top of the machine. The end of the pressure pipe 20 communicates with a pressure scale 21 for indicating the weight of the material dumped into the skip. An air chamber 22 is preferably used in connection with the pipe 20 for proper balance.

In using this apparatus, the cables 6 should maintain the skip 4 a suitable distance above the ground, as shown in Figure 2. Consequently, when material is dumped into the skip 4 a strain will be exerted upon the cables 6, which will tend to draw the pulleys 7 with the supporting shaft 8 in a downward direction. As the pulleys 7 move downwardly the arms 9 will, of course, move therewith and will cause a compression action upon the piston 16 for compressing the fluid in the fluid chamber. The pressure in the fluid chamber will be communicated thru the pipes 19 and 30 to the pressure scale 21, which will indicate the weight of the material placed in the skip. After a sufficient quantity has been placed in the skip, it may be elevated by rotating the shaft 12 and winding the cables upon their drums, or, if desired, different ingredients may be dumped into the skip before it is elevated. In such a case it is possible to weigh the different ingredients as they are put into the skip.

In the modification shown in Figures 4, 5 and 6, a coil spring 23 is used instead of liquid fluid. To this end a spring housing 24 is attached beneath an arm 25 that supports the pulley 7. A piston 26 is positioned on the top of the spring and this piston is provided with a stem 27 that extends thru the top of the spring housing 24 into contact with a bearing socket 28 formed in the arm 25. A scale 29 is attached adjacent the arm 25 and a pointer 30 is adapted to move over the scale. This pointer is pivoted by a bearing 31 secured to the top of the spring housing. The pointer 30 is secured upon a small pivot pin 32 and this pivot pin has a lug 33 which extends beneath the bearing of the socket 28, whereby any depression of the arm 25 will cause the pointer to rotate over the scale for indicating the weight of the materials placed in the skip.

It will be noted, by reference to Figure 6, that the arms 25 are rigidly secured upon the shaft 10, while in the first form of the invention the arms 9 may be mounted to rotate upon the shaft 10. The purpose of securing the arms 25 to the shaft 10 is so that only one spring 23, in connection with one arm 25 is required.

It will be appreciated that, according to this invention, it is possible to secure the weight of the material put into the skip, and it is unnecessary to weigh the material before it is put into the skip. Consequently, a great deal of time and labor is saved in the utilization of this invention.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a mixing machine including a swingable skip, a movable support, a cable attached to said skip and trained over said movable support, a scale attached to said machine, and means responsive to the movement of said movable support for actuating said scale.

2. In a mixing machine including a movable skip, a cable attached to said skip and a movable support over which said cable is trained, a fluid chamber beneath said support, a piston in said fluid chamber adapted to be actuated by said support, and a scale having communication with said fluid chamber for the purpose set forth.

3. In a mixing machine comprising a movable skip, a pair of cables attached to said skip, movable supports over which said cables are trained, means providing a fluid chamber beneath each movable support, a pipe connecting said fluid chambers, a piston in each fluid chamber in operating relation with the adjacent movable support, and a weight indicating device having means communicating with one of said fluid chambers.

4. In a mixing machine a movable skip, a cable connected to said skip, an arcuate arm having a pulley over which said cable is trained, means providing a fluid chamber beneath said arm, a piston in said fluid chamber having a stem in contact with said arcuate arm, and a weight indicating device in communication with said fluid chamber.

5. In a mixing machine, a skip mounted thereon for upward and downward movement, means for raising and lowering said skip, a movable support for said means, and a weighing attachment on said machine responsive to the movements of said support.

6. In a mixing machine, a skip, means for mounting said skip for upward and downward movement, means for operating said skip including a movable support, a scale, and means responsive to the movements of said support for actuating said scale.

In testimony whereof I have hereunto subscribed my name.

SIDNEY L. WALKER.